(12) United States Patent
Venugopal et al.

(10) Patent No.: US 12,058,691 B2
(45) Date of Patent: Aug. 6, 2024

(54) COMMON BEAM AS A DEFAULT BEAM FOR APERIODIC CHANNEL STATE INFORMATION REFERENCE SIGNALS

(71) Applicant: QUALCOMM Incorporated, San Diego, CA (US)

(72) Inventors: Kiran Venugopal, Raritan, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 280 days.

(21) Appl. No.: 17/452,621

(22) Filed: Oct. 28, 2021

(65) Prior Publication Data

US 2022/0150944 A1 May 12, 2022

Related U.S. Application Data

(60) Provisional application No. 63/110,746, filed on Nov. 6, 2020.

(51) Int. Cl.
*H04W 4/00* (2018.01)
*H04B 7/06* (2006.01)
*H04L 5/00* (2006.01)
*H04W 72/23* (2023.01)

(52) U.S. Cl.
CPC .......... *H04W 72/23* (2023.01); *H04B 7/0626* (2013.01); *H04L 5/0048* (2013.01)

(58) Field of Classification Search
None
See application file for complete search history.

(56) References Cited

U.S. PATENT DOCUMENTS

| 11,659,539 | B2 * | 5/2023 | Rahman | H04W 72/046 370/329 |
| 2018/0219664 | A1 * | 8/2018 | Guo | H04W 24/10 |
| 2021/0360594 | A1 * | 11/2021 | Park | H04B 7/0695 |

OTHER PUBLICATIONS

International Search Report and Written Opinion—PCT/US2021/072124—ISA/EPO—May 9, 2022.

(Continued)

*Primary Examiner* — Zewdu A Beyen
(74) *Attorney, Agent, or Firm* — Harrity & Harrity, LLP

(57) ABSTRACT

Various aspects of the present disclosure generally relate to wireless communication. In some aspects, a user equipment (UE) may identify a transmission configuration indicator (TCI) state that is associated with at least two signals or at least two communication channels. The UE may use the TCI state as the default beam to receive an aperiodic channel state information reference signal (CSI-RS) based at least in part on a scheduling offset between a scheduling downlink control information, which schedules the aperiodic CSI-RS, and a transmission time of the aperiodic CSI-RS being less than a beam switch latency threshold. Numerous other aspects are provided.

28 Claims, 10 Drawing Sheets

(56) References Cited

OTHER PUBLICATIONS

NTT DOCOMO, et al., "Remaining Issues on Multi-TRP/Panel Transmission", 3GPP TSG RAN WG1 #102-e, 3GPP Draft, R1-2006700, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, 12 Pages, Aug. 7, 2020 (Aug. 7, 2020), XP051915440, Retrieved from the Internet: URL: https://ftp.3gpp.org/tsg_ran/WG1_RL1/TSGR1_102-e/Docs/R1-2006700.zip R1-2006700.docx [retrieved on Aug. 7, 2020] p. 1-p. 6.

Qualcomm Incorporated: "Enhancements on Multi-Beam Operation", 3GPP TSG RAN WG1 Meeting #101-e, 3GPP Draft, R1-2004464, 3rd Generation Partnership Project (3GPP), Mobile Competence Centre, 650, Route Des Lucioles, F-06921 Sophia-Antipolis Cedex, France, vol. RAN WG1, No. May 25, 2020-Jun. 5, 2020, 7 Pages, May 16, 2020 (May 16, 2020, XP051886193, Retrieved from the Internet: URL: https://ftp.3gpp.org/tsg_ran/WG1_RL1/TSGR1_101-e/Docs/R1-2004464.zip R1-2004464 Enhancements on Multi-beam Operation.docx [retrieved on May 16, 2020] p. 5-p. 7.

\* cited by examiner

COMMON BEAM AS A DEFAULT BEAM FOR APERIODIC CHANNEL STATE INFORMATION REFERENCE SIGNALS

CROSS-REFERENCE TO RELATED APPLICATION

This Patent application claims priority to U.S. Provisional Patent Application No. 63/110,746, filed on Nov. 6, 2020, entitled "DETERMINATION OF A COMMON BEAM AS A DEFAULT BEAM FOR APERIODIC CHANNEL STATE INFORMATION REFERENCE SIGNALS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for using a common beam as a default beam for aperiodic channel state information (CSI) reference signals (CSI-RSs).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes identifying a transmission configuration indicator (TCI) state that is associated with at least two signals or at least two communication channels; and using the TCI state as a default beam for receiving an aperiodic channel state information reference signal (CSI-RS) based at least in part on a scheduling offset between a scheduling downlink control information (DCI), which schedules the aperiodic CSI-RS, and a transmission time of the aperiodic CSI-RS being less than a beam switch latency threshold.

In some aspects, a method of wireless communication performed by a base station includes transmitting, to a UE, an indication that a TCI state, that is associated with at least two signals or at least two communication channels, is to be used as a default beam for aperiodic CSI-RSs; and transmitting, to the UE, an aperiodic CSI-RS that is to be received by the UE using the TCI state as the default beam.

In some aspects, a UE for wireless communication includes a memory and one or more processors coupled to the memory. The one or more processors may be configured to: identify a TCI state that is associated with at least two signals or at least two communication channels; and use the TCI state as a default beam to receive an aperiodic CSI-RS based at least in part on a scheduling offset between a scheduling DCI, which schedules the aperiodic CSI-RS, and a transmission time of the aperiodic CSI-RS being less than a beam switch latency threshold.

In some aspects, a base station for wireless communication includes a memory and one or more processors coupled to the memory. The one or more processors may be configured to: transmit, to a UE, an indication that a TCI state, that is associated with at least two signals or at least two communication channels, is to be used as a default beam for aperiodic CSI-RSs; and transmit, to the UE, an aperiodic CSI-RS that is to be received by the UE using the TCI state as the default beam.

In some aspects, a non-transitory computer-readable medium storing a set of instructions for wireless communication includes one or more instructions that, when executed by one or more processors of a UE, cause the UE to: identify a TCI state that is associated with at least two signals or at least two communication channels; and use the TCI state as the default beam to receive an aperiodic CSI-RS based at least in part on a scheduling offset between a scheduling DCI, which schedules the aperiodic CSI-RS, and a transmission time of the aperiodic CSI-RS being less than a beam switch latency threshold.

In some aspects, a non-transitory computer-readable medium storing a set of instructions for wireless communication includes one or more instructions that, when executed by one or more processors of a base station, cause the base station to: transmit, to a UE, an indication that a TCI state, that is associated with at least two signals or at least two communication channels, is to be used as a default beam for aperiodic CSI-RSs; and transmit, to the UE, an aperiodic CSI-RS that is to be received by the UE using the TCI state as the default beam.

In some aspects, an apparatus for wireless communication includes means for identifying a TCI state that is associated with at least two signals or at least two communication channels; and means for using the TCI state as a default beam for receiving an aperiodic CSI-RS based at least in part on a scheduling offset between a scheduling DCI, which schedules the aperiodic CSI-RS, and a transmission time of the aperiodic CSI-RS being less than a beam switch latency threshold.

In some aspects, an apparatus for wireless communication includes means for transmitting, to a UE, an indication that a TCI state, that is associated with at least two signals or communication channels, is to be used as a default beam for aperiodic CSI-RSs; and means for transmitting, to the UE, an aperiodic CSI-RS that is to be received by the UE using the TCI state as the default beam.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
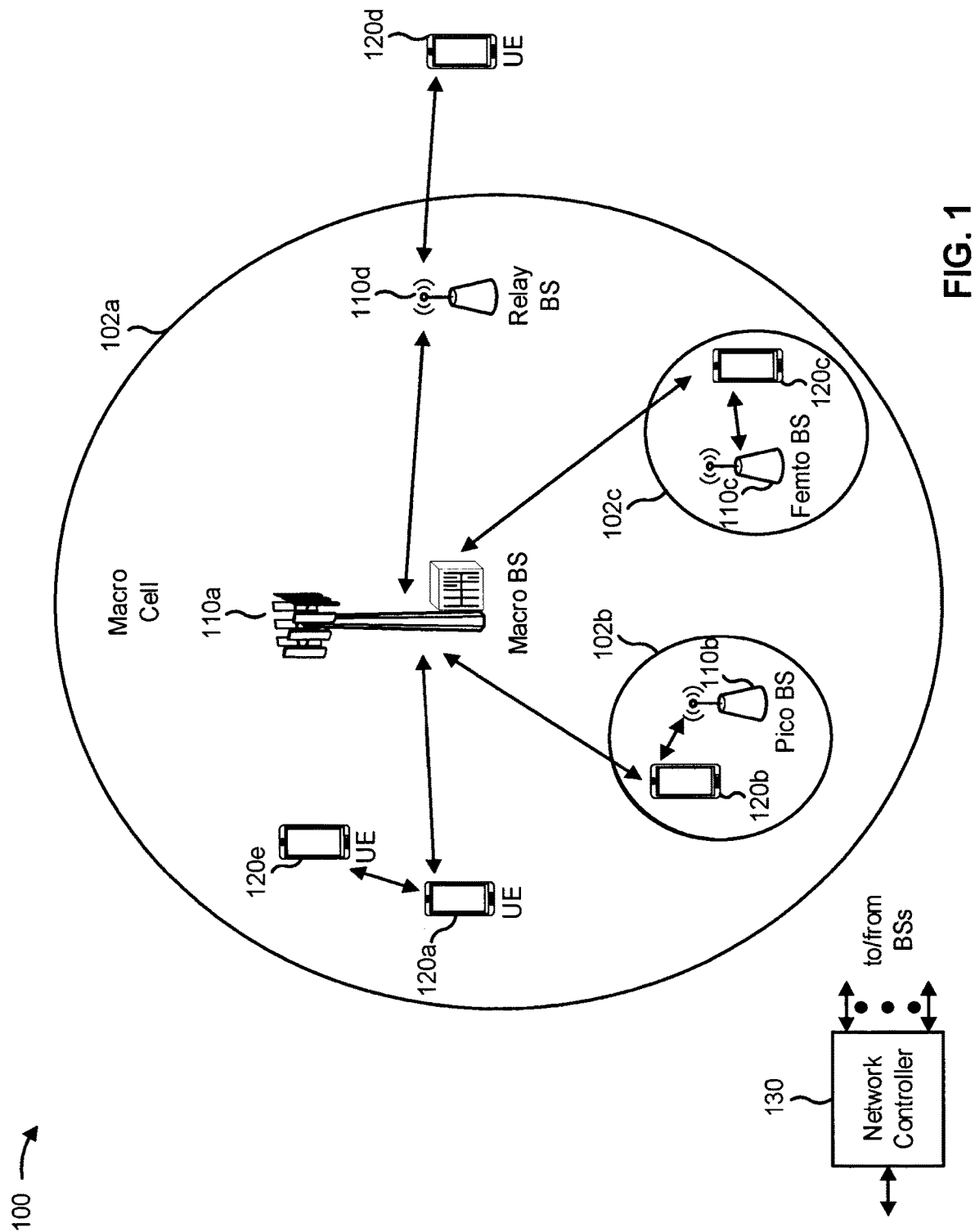
FIG. 1 is a diagram illustrating an example of a wireless network, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

In some cases, a base station may configure a user equipment (UE) to use a default beam (or a default transmission configuration indicator (TCI) state) for aperiodic channel state information reference signals (CSI-RSs) in certain scenarios. For example, the base station may configure the UE to use a default beam if a scheduling offset between a scheduling downlink control information (DCI) (e.g., that schedules an aperiodic CSI-RS) and a transmission time of the aperiodic CSI-RS scheduled by the scheduling DCI is less than a beam switch latency threshold of the UE. For example, the scheduling DCI may indicate a beam that is to be used for the aperiodic CSI-RS. However, if the scheduling offset between the scheduling DCI and the transmission time of the aperiodic CSI-RS scheduled by the scheduling DCI is less than the beam switch latency threshold, then the UE may not have enough time to identify and/or switch to the beam identified by the scheduling DCI. Therefore, the base station may configure the UE to use a default beam in these scenarios. The UE may determine the default beam by identifying the beam of a control resource set (CORESET) with a lowest identifier in the latest monitored slot. However, as the default beam follows the beam of the CORESET with a lowest identifier in the latest monitored slot, the default beam may vary over time (e.g., across different slots) as the beam used by a CORESET may vary. As a result, the default beam may be associated with poor signal strength, poor signal quality, poor transmission power, and/or may be otherwise not optimized.

Some techniques and apparatuses described herein enable using a common beam (e.g., a TCI state that is associated with at least two signals or communication channels) as a default beam for aperiodic CSI-RSs. For example, a UE may determine (or identify) a common beam that is associated with two or more signals or communication channels. The UE may determine that the common beam is to be used as the default beam for aperiodic CSI-RSs (e.g., the default beam to be used if a scheduling offset between a scheduling DCI and a transmission time of an aperiodic CSI-RS scheduled by the scheduling DCI is less than a beam switch latency threshold of the UE). The UE may determine that an aperiodic CSI-RS is to be received using the default beam, and the UE may receive the aperiodic CSI-RS using the common beam as the default beam.

As a result, the UE may be enabled to use an optimized common beam as the default beam for aperiodic CSI-RSs, thereby improving the efficiency of the communications. For example, as the default beam may vary over time, the default beam may not be optimized and/or may result in poor signal strength or quality. As the common beam may remain constant over time (and is optimized, as described above), the use of the common beam as the default beam for aperiodic CSI-RSs may result in improved communication performance and reliability when a default beam is used for an aperiodic CSI-RS. Moreover, the use of the common beam as the default beam for aperiodic CSI-RSs may reduce beam management latency and overhead. Additionally, the use of an optimized common beam as the default beam for aperiodic CSI-RSs may improve downlink channel estimation (e.g., downlink CSI acquisition) and/or CSI-RS beam management procedures by enabling the UE 120 to receive and/or measure an aperiodic CSI-RS using an optimized common beam, rather than a default beam that varies over time.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
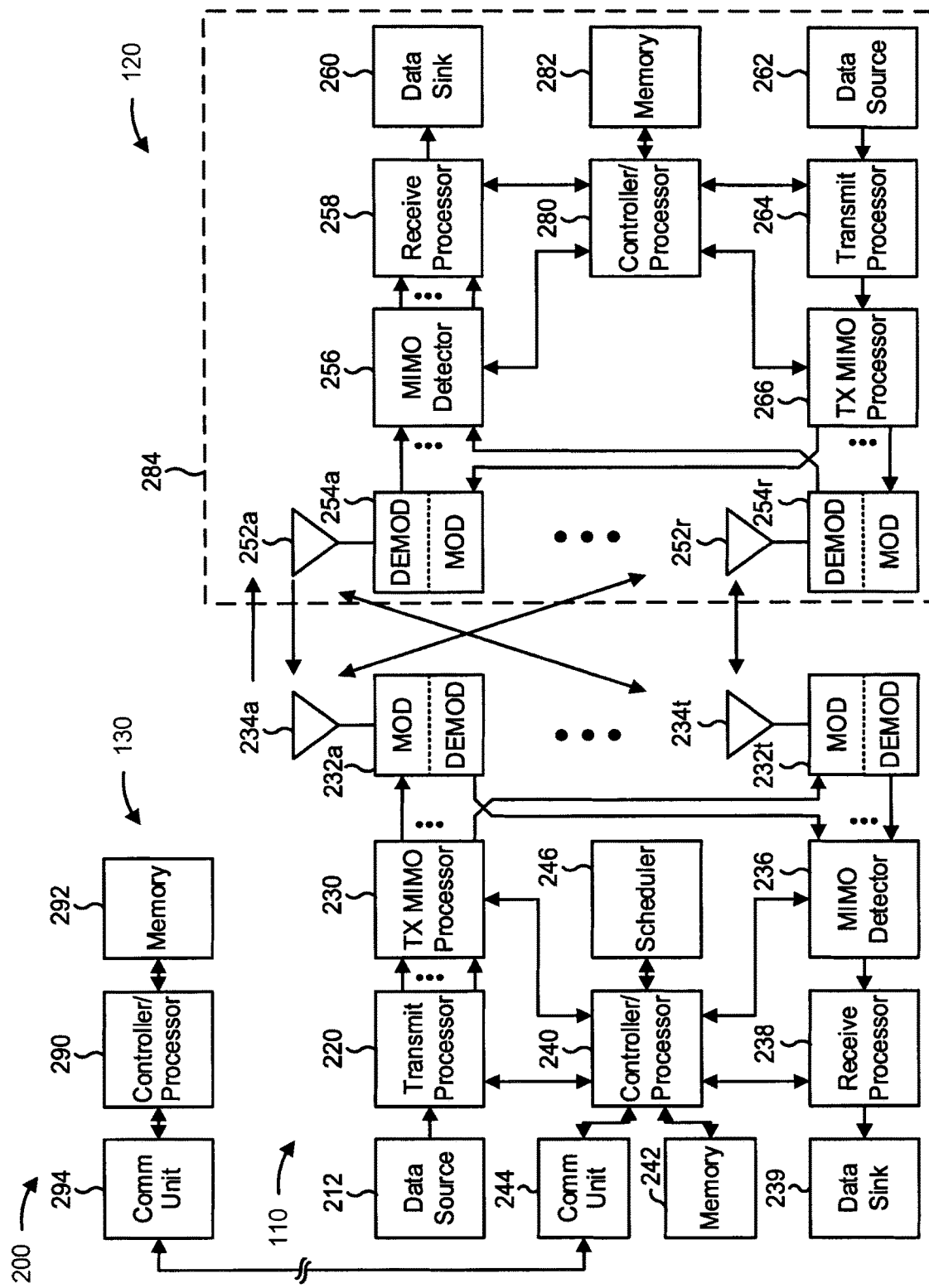
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6-10).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6-10.

Controller/processor 240 of base station 110, controller/processor 280 of UE 120, and/or any other component(s) of FIG. 2 may perform one or more techniques associated with using a common beam as a default beam for aperiodic channel state information reference signals (CSI-RSs), as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, the UE 120 includes means for identifying a transmission configuration indicator (TCI) state that is associated with at least two signals or at least two communication channels; means for determining that the TCI state is to be used as a default beam for aperiodic CSI-RSs based at least in part on a scheduling offset between a scheduling downlink control information (DCI), which schedules the aperiodic CSI-RS, and a transmission time of the aperiodic CSI-RS being less than a beam switch latency threshold; and/or means for using the TCI state as the default beam for receiving an aperiodic CSI-RS. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, and/or memory 282.

In some aspects, the UE 120 includes means for identifying the TCI state based at least in part on an implicit rule. In some aspects, the UE 120 includes means for determining that the TCI state is always to be used by the UE as the default beam if a scheduling offset between scheduling DCI and a transmission time of an aperiodic CSI-RS scheduled by the scheduling DCI is less than the beam switch latency threshold.

In some aspects, the UE 120 includes means for receiving, from a base station, an indication that the TCI state is to be used as the default beam for aperiodic CSI-RSs. In some aspects, the UE 120 includes means for receiving the indication via a DCI communication. In some aspects, the UE 120 includes means for receiving the indication via a medium access control (MAC) control element (MAC-CE) communication. In some aspects, the UE 120 includes means for receiving the indication via a radio resource control (RRC) communication.

In some aspects, the UE 120 includes means for identifying the TCI state based at least in part on an explicit rule. In some aspects, the UE 120 includes means for receiving, from a base station, an indication that the TCI state is to be used as the default beam for aperiodic CSI-RSs. In some aspects, the UE 120 includes means for receiving the indication via a DCI communication. In some aspects, the UE 120 includes means for receiving the indication via MAC-CE communication. In some aspects, the UE 120 includes means for receiving the indication via an RRC communication.

In some aspects, the UE 120 includes means for receiving the indication of the TCI state and the indication that the TCI state is to be used as the default beam for aperiodic CSI-RSs in a same signal.

In some aspects, the UE 120 includes means for determining that the TCI state is to be used for a multiple transmit receive point (multi-TRP) configuration. In some aspects, the UE 120 includes means for determining that the TCI state, associated with a TRP of the multi-TRP configuration, is to be used as the default beam for aperiodic CSI-RSs associated with the TRP.

In some aspects, the UE 120 includes means for receiving, from a base station, an indication that the TCI state is not to be used as the default beam for aperiodic CSI-RSs. In some aspects, the UE 120 includes means for determining another default beam for aperiodic CSI-RSs based at least in part on a quasi co-location assumption of a control resource set with a lowest identifier in a latest monitored slot of an active downlink bandwidth part. In some aspects, the UE 120 includes means for determining that another TCI state, that was determined prior to determining the common beam, is to be used as a new default beam for aperiodic CSI-RSs.

In some aspects, the base station 110 includes means for transmitting, to a UE, an indication that a TCI state, that is associated with at least two signals or communication channels, is to be used as a default beam for aperiodic CSI-RSs; and/or means for transmitting, to the UE, an aperiodic CSI-RS that is to be received by the UE using the TCI state as the default beam. The means for the base station 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station 110 includes means for transmitting, to the UE, a configuration indicating that the UE is to use the default beam for aperiodic CSI-RSs if a scheduling offset between a scheduling DCI and a transmission time of an aperiodic CSI-RS that is scheduled by the scheduling DCI is less than the beam switch latency threshold.

In some aspects, the base station 110 includes means for transmitting the indication via a DCI communication. In some aspects, the base station 110 includes means for transmitting the indication via a MAC-CE communication. In some aspects, the base station 110 includes means for transmitting the indication via an RRC communication.

In some aspects, the base station 110 includes means for transmitting, to the UE, an indication of the TCI state.

In some aspects, the base station 110 includes means for transmitting the indication of the TCI state and the indication that the common beam is to be used as the default beam for aperiodic CSI-RSs in a same signal.

In some aspects, the base station 110 includes means for determining that the TCI state is to be used for a multiple multi-TRP configuration.

In some aspects, the base station 110 includes means for transmitting, to the UE, an indication that the TCI state, associated with a TRP of the multi-TRP configuration, is to be used as the default beam for aperiodic CSI-RSs associated with the TRP.

In some aspects, the base station 110 includes means for transmitting, to the UE, an indication that the TCI state is no longer to be used as the default beam.

In some aspects, the base station 110 includes means for determining the TCI state that is associated with at least two signals or communication channels.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
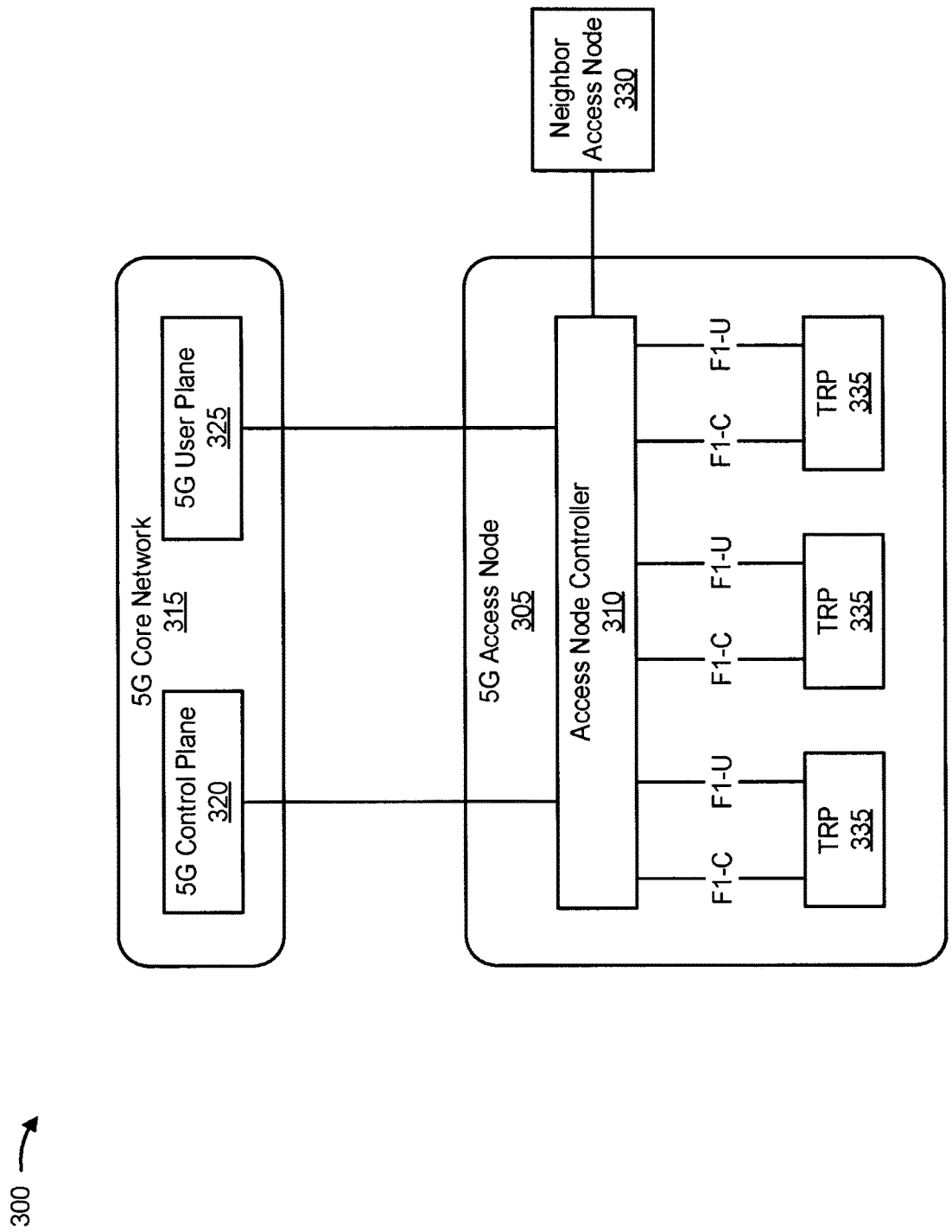
FIG. 3 illustrates an example logical architecture of a distributed radio access network (RAN), according to aspects of the present disclosure.

FIG. 3 illustrates an example logical architecture of a distributed RAN 300, according to aspects of the present disclosure.

A 5G access node 305 may include an access node controller 310. The access node controller 310 may be a central unit (CU) of the distributed RAN 300. In some aspects, a backhaul interface to a 5G core network 315 may terminate at the access node controller 310. The 5G core network 315 may include a 5G control plane component 320 and a 5G user plane component 325 (e.g., a 5G gateway), and the backhaul interface for one or both of the 5G control plane and the 5G user plane may terminate at the access node controller 310. Additionally, or alternatively, a backhaul interface to one or more neighbor access nodes 330 (e.g., another 5G access node 305, an LTE access node, and/or the like) may terminate at the access node controller 310.

The access node controller 310 may include and/or may communicate with one or more TRPs 335 (e.g., via an F1 Control (F1-C) interface and/or an F1 User (F1-U) interface). A TRP 335 may be a distributed unit (DU) of the distributed RAN 300. In some aspects, a TRP 335 may correspond to a base station 110 described above in connection with FIG. 1. For example, different TRPs 335 may be included in different base stations 110. Additionally, or alternatively, multiple TRPs 335 may be included in a single base station 110. In some aspects, a base station 110 may include a CU (e.g., access node controller 310) and/or one or more DUs (e.g., one or more TRPs 335). In some cases, a TRP 335 may be referred to as a cell, a panel, an antenna array, an array, and/or the like.

A TRP 335 may be connected to a single access node controller 310 or to multiple access node controllers 310. In some aspects, a dynamic configuration of split logical functions may be present within the architecture of distributed RAN 300. For example, a packet data convergence protocol (PDCP) layer, a radio link control (RLC) layer, a medium access control (MAC) layer, and/or the like may be configured to terminate at the access node controller 310 or at a TRP 335.

In some aspects, multiple TRPs 335 may transmit communications (e.g., the same communication or different communications) in the same transmission time interval (TTI) (e.g., a slot, a mini-slot, a subframe, a symbol, and/or the like) or different TTIs using different quasi co-location (QCL) relationships (e.g., different spatial parameters, different transmission configuration indicator (TCI) states, different precoding parameters, different beamforming parameters, and/or the like). In some aspects, a TCI state may be used to indicate one or more QCL relationships. A beam may be associated with a TCI state. A TCI state may indicate a directionality or a characteristic of the beam, such as one or more QCL properties of a downlink beam. A QCL property may include, for example, a Doppler shift, a Doppler spread, an average delay, a delay spread, or spatial receive parameters, among other examples. A TRP 335 may be configured to individually (e.g., using dynamic selection) or jointly (e.g., using joint transmission with one or more other TRPs 335) serve traffic to a UE 120.

As indicated above, FIG. 3 is provided as an example. Other examples may differ from what was described with regard to FIG. 3.

Figure 4:
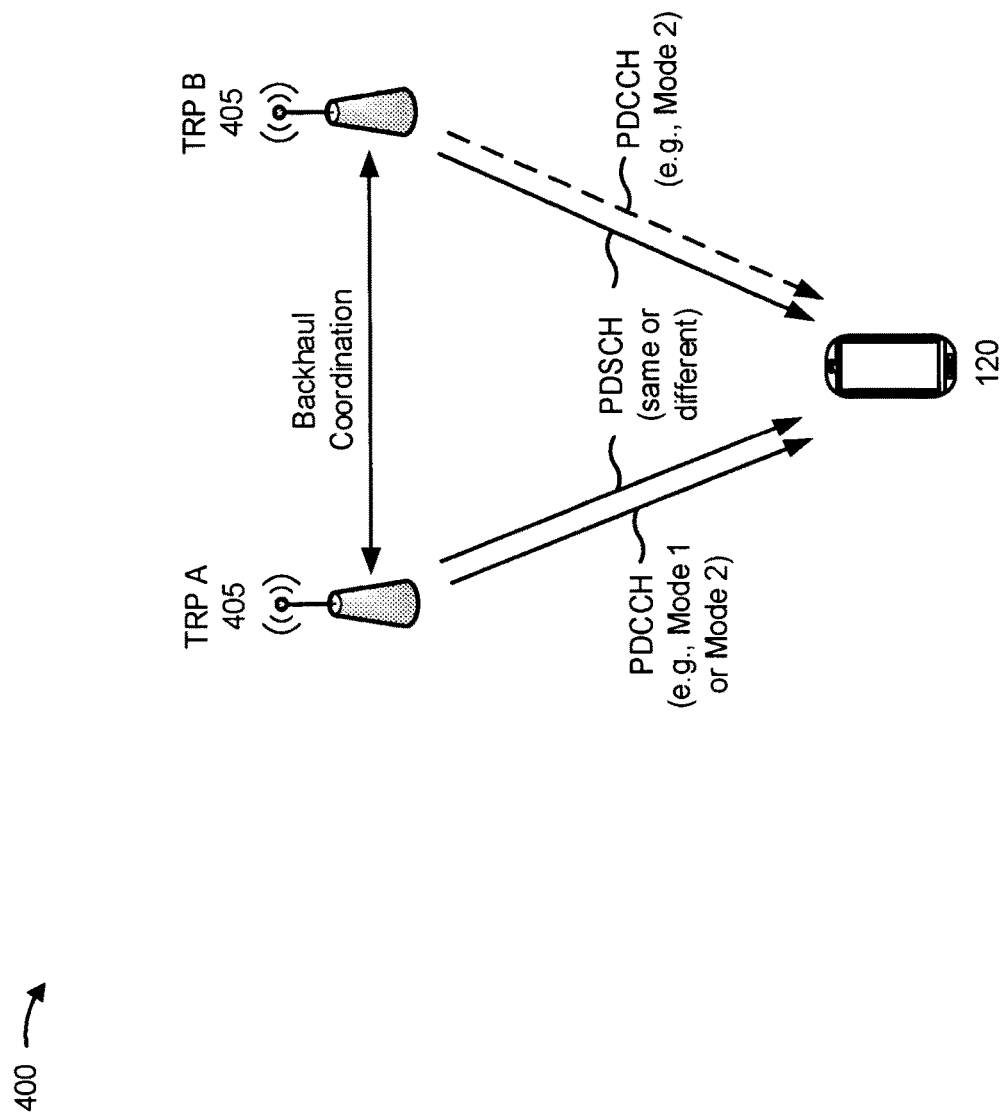
FIG. 4 is a diagram illustrating an example of multiple transmit receive point (multi-TRP) communication, in accordance with the present disclosure.

FIG. 4 is a diagram illustrating an example 400 of multi-TRP communication, in accordance with the present disclosure. In some aspects, multi-TRP communication may be referred to as multi-panel communication. As shown in FIG. 4, multiple TRPs 405 may communicate with the same UE 120. A TRP 405 may correspond to a TRP 335 described above in connection with FIG. 3.

The multiple TRPs 405 (shown as TRP A and TRP B) may communicate with the same UE 120 in a coordinated manner (e.g., using coordinated multipoint transmissions and/or the like) to improve reliability, increase throughput, and/or the like. The TRPs 405 may coordinate such communications via an interface between the TRPs 405 (e.g., a backhaul interface, an access node controller 310, and/or the like). The interface may have a smaller delay and/or higher capacity when the TRPs 405 are co-located at the same base station 110 (e.g., when the TRPs 405 are different antenna arrays or panels of the same base station 110), and may have a larger delay and/or lower capacity (as compared to co-location) when the TRPs 405 are located at different base stations 110. The different TRPs 405 may communicate with the UE 120 using different QCL relationships (e.g., different TCI states), different demodulation reference signal (DMRS) ports, different layers (e.g., of a multi-layer communication), and/or the like.

In a first multi-TRP transmission mode (e.g., Mode 1), a single physical downlink control channel (PDCCH) may be used to schedule downlink data communications for a single physical downlink shared channel (PDSCH). In this case, multiple TRPs 405 (e.g., TRP A and TRP B) may transmit communications to the UE 120 on the same PDSCH. For example, a communication may be transmitted using a single codeword with different spatial layers for different TRPs 405 (e.g., where one codeword maps to a first set of layers transmitted by a first TRP 405 and maps to a second set of layers transmitted by a second TRP 405). As another example, a communication may be transmitted using multiple codewords, where different codewords are transmitted by different TRPs 405 (e.g., using different sets of layers). In either case, different TRPs 405 may use different QCL relationships (e.g., different TCI states) for different DMRS ports corresponding to different layers. For example, a first TRP 405 may use a first QCL relationship or a first TCI state for a first set of DMRS ports corresponding to a first set of layers, and a second TRP 405 may use a second (different) QCL relationship or a second (different) TCI state for a second (different) set of DMRS ports corresponding to a second (different) set of layers. In some aspects, a TCI state in downlink control information (DCI) (e.g., transmitted on the PDCCH, such as DCI format 1_0, DCI format 1_1, and/or the like) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (e.g., Mode 1).

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP 405, and a second PDCCH may schedule a second codeword to be transmitted by a second TRP 405. Furthermore, first DCI (e.g., transmitted by the first TRP 405) may schedule a first PDSCH communication associated with a first set of DMRS ports with a first QCL relationship (e.g., indicated by a first TCI state) for the first TRP 405, and second DCI (e.g., transmitted by the second TRP 405) may schedule a second PDSCH communication associated with a second set of DMRS ports with a second QCL relationship (e.g., indicated by a second TCI state) for the second TRP 405. In this case, DCI (e.g., having DCI format 1_0, DCI format 1_1, and/or the like) may indicate a corresponding TCI state for a TRP 405 corresponding to the DCI. The TCI field of a DCI indicates the corresponding TCI state (e.g., the TCI field of the first DCI indicates the first TCI state and the TCI field of the second DCI indicates the second TCI state).

As indicated above, FIG. 4 is provided as an example. Other examples may differ from what is described with respect to FIG. 4.

Figure 5:
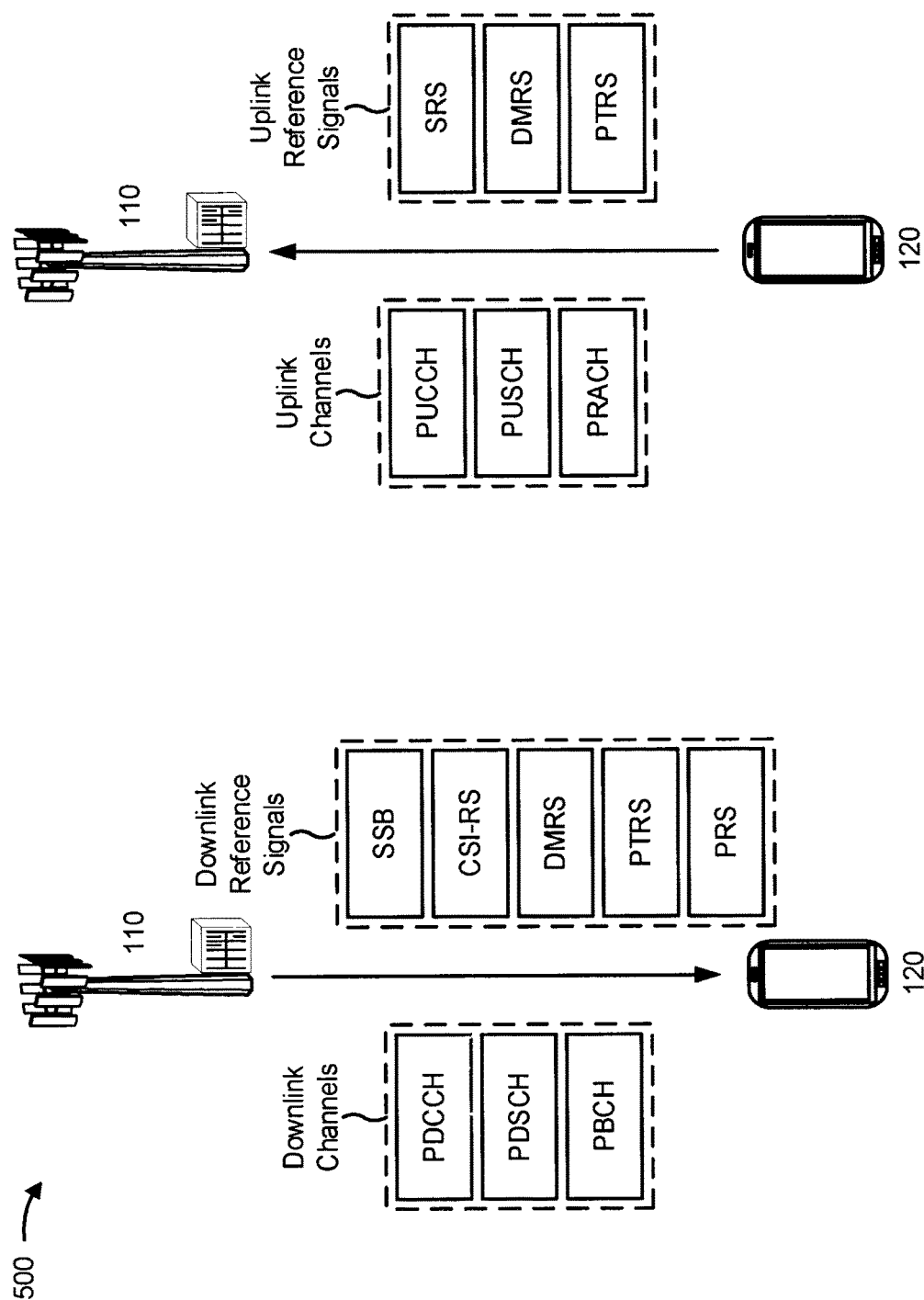
FIG. 5 is a diagram illustrating an example of physical channels and reference signals in a wireless network, in accordance with the present disclosure.

FIG. 5 is a diagram illustrating an example 500 of physical channels and reference signals in a wireless network, in accordance with the present disclosure. As shown in FIG. 5, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a demodulation reference signal (DMRS), a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The base station 110 may use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based at least in part on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based at least in part on OTDOA measurements associated with the PRSs received from the multiple cells. In some aspects, the base station 110 may then calculate a position of the UE 120 based at least in part on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

As indicated above, FIG. 5 is provided as an example. Other examples may differ from what is described with regard to FIG. 5.

In some cases, a common beam may be used for at least two signals or communication channels in a wireless communications system to reduce beam management latency and overhead. A common beam may be a beam (e.g., or a TCI state) that is associated with two or more signals or communication channels (e.g., the same beam is to be used when transmitting and/or receiving using any of the two or more signals or communication channels). For example, the two or more signals or communication channels can be any combination of data signals, data channels (e.g., PDSCH and/or PUSCH), control signals, control channels (e.g., PDCCH, PUCCH, and/or PRACH), reference signals (e.g., CSI-RS, SSB, PRS, SRS, and/or DMRS), downlink signals or channels, and/or uplink signals or channels, among other examples. "Common beam" may refer to a TCI state that is associated with two or more signals or communication channels. A common beam may be optimized based at least in part on one or more parameters. For example, the common beam may be refined as a sharp beam or narrow beam (e.g., a beamforming procedure may be applied to the common beam to improve a transmission power associated with the beam and/or a received signal strength), which may improve a link budget for certain UEs (e.g., UEs that have limited mobility or are moving at a low speed). In another example, a common beam may be optimized by selecting a wide beam width, which may improve robustness in high mobility or blocking scenarios.

In multi-beam operations (e.g., for FR1 and/or FR2 operations), efficiencies in beam management may enable reductions in beam management latency and overhead. This may enable higher intra-cell mobility and layer 1 or layer 2

(L1/L2) centric inter-cell mobility and/or an expanded number of configured TCI states. For example, the use of a common beam for data, control transmission and reception may allow for the realization of such efficiencies in various scenarios, such as intra-band carrier aggregation. Other techniques that may allow for the realization of efficiencies in beam management procedures may include using a unified TCI framework for downlink and uplink beam indication (e.g., using TCI state(s) to identify downlink beams and uplink beams) or using enhanced signaling mechanisms that may improve latency and efficiency through increased usage of dynamic control signaling in lieu of radio resource control (RRC) signaling.

In some cases, a base station may configure a UE to use a default beam (or a default TCI state) for aperiodic CSI-RSs in certain scenarios (e.g., in an RRC configuration). An aperiodic CSI-RS may refer to a CSI-RS that is dynamically scheduled by DCI. For example, the base station may configure the UE to use a default beam if a scheduling offset between a scheduling DCI (e.g., that schedules an aperiodic CSI-RS) and a transmission time of the aperiodic CSI-RS scheduled by the scheduling DCI is less than a beam switch latency threshold of the UE. For example, the scheduling DCI may indicate a beam that is to be used for the aperiodic CSI-RS. However, if the scheduling offset between the scheduling DCI and the transmission time of the aperiodic CSI-RS scheduled by the scheduling DCI is less than the beam switch latency threshold, then the UE may not have enough time to identify and/or switch to the beam identified by the scheduling DCI. Therefore, the base station may configure the UE to use a default beam in these scenarios. The UE may determine the default beam by identifying the beam of a control resource set (CORESET) with a lowest identifier in the latest monitored slot. The determination of the default beam by the UE may be set out, or otherwise defined, by a wireless communication standard, such as 3GPP Technical Specification 38.214, 5.2.1.5.1. However, as the default beam follows the beam of the CORESET with a lowest identifier in the latest monitored slot, the default beam may vary over time (e.g., across different slots) as the beam used by a CORESET may vary. As a result, the default beam may be associated with poor signal strength, poor signal quality, poor transmission power, and/or may be otherwise not optimized.

Some techniques and apparatuses described herein enable determination of a common beam (e.g., a TCI state that is associated with at least two signals and/or at least two communication channels) as a default beam for aperiodic CSI-RSs. For example, a UE may determine (or identify) a common beam that is associated with two or more signals or communication channels. The UE may use the common beam (e.g., the TCI state) to receive the aperiodic CSI-RS.

As a result, the UE may be enabled to use an optimized common beam as the default beam for aperiodic CSI-RSs, thereby improving the efficiency of the communications. For example, as the default beam may vary over time, the default beam may not be optimized and/or may result in poor signal strength or quality. As the common beam may remain constant over time (and is optimized, as described above), the use of the common beam as the default beam for aperiodic CSI-RSs may result in improved communication performance and reliability when a default beam is used for an aperiodic CSI-RS. Moreover, the use of the common beam as the default beam for aperiodic CSI-RSs may reduce beam management latency and overhead. Additionally, the use of an optimized common beam as the default beam for aperiodic CSI-RSs may improve downlink channel estimation (e.g., downlink CSI acquisition) and/or CSI-RS beam management procedures by enabling the UE 120 to receive and/or measure an aperiodic CSI-RS using an optimized common beam, rather than a default beam that varies over time.

Figure 6:
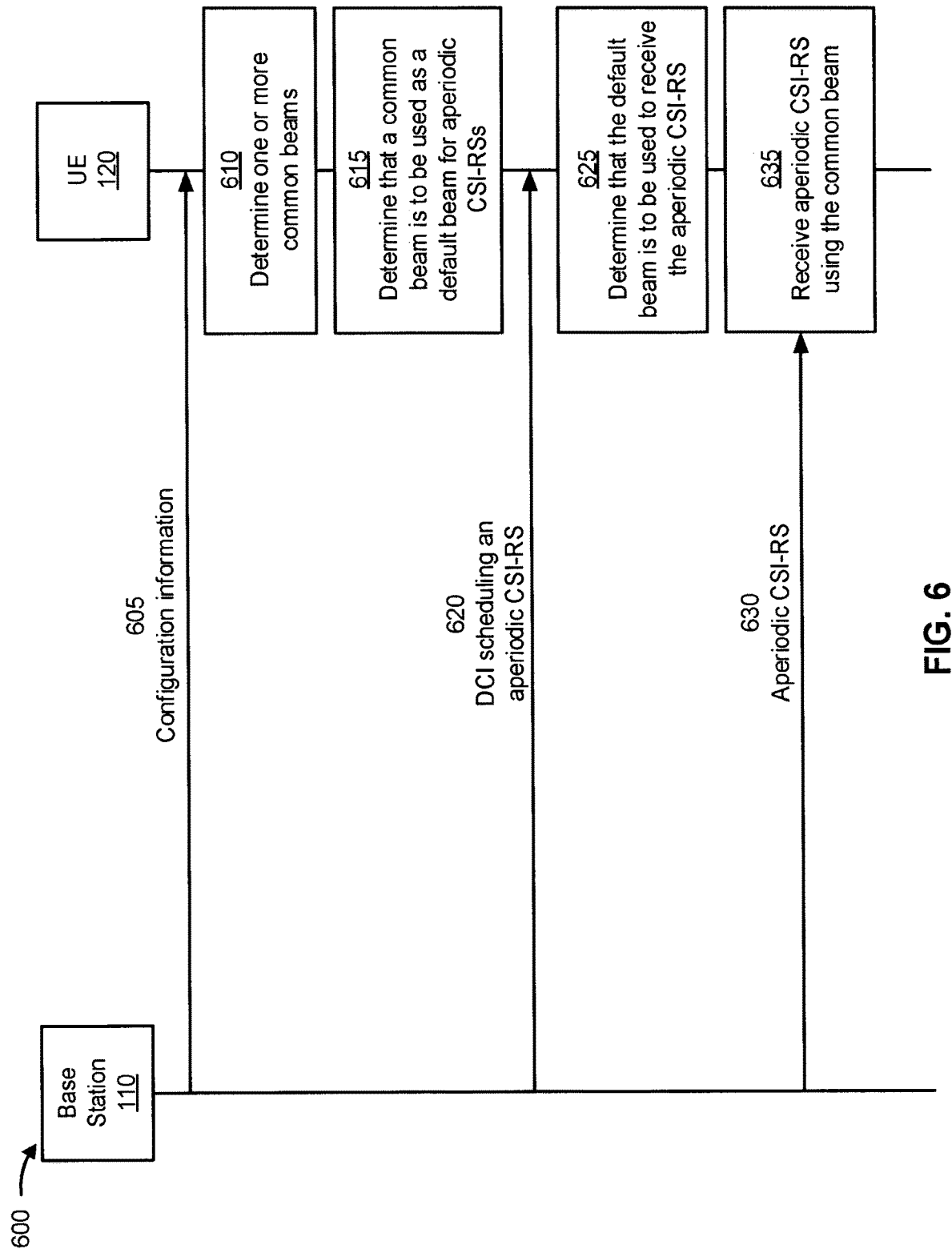
FIG. 6 is a diagram illustrating an example associated with using a common beam as a default beam for aperiodic channel state information reference signals (CSI-RSs), in accordance with the present disclosure.

FIG. 6 is a diagram illustrating an example 600 associated with using a common beam as a default beam for aperiodic CSI-RSs, in accordance with the present disclosure. As shown in FIG. 6, example 600 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink.

As shown by reference number 605, the base station 110 may transmit, and the UE 120 may receive, configuration information. The configuration information may indicate whether the UE 120 is to use a default beam for aperiodic CSI-RSs. For example, the UE 120 may be configured, by the base station 110, to use a default beam if a scheduling offset between a scheduling DCI and a transmission time of an aperiodic CSI-RS scheduled by the scheduling DCI is less than a beam switch latency threshold of the UE, as described above. In some aspects, the configuration information may indicate one or more common beams.

As shown by reference number 610, the UE 120 may determine (or identify) one or more common beams. In some aspects, the UE 120 may determine a common beam based at least in part on an implicit rule. For example, where a CORESET is configured in an active downlink bandwidth part (BWP), an implicit rule may specify that the common beam is identified based at least in part on a QCL assumption for receiving a CORESET with the lowest or highest identifier in the active downlink BWP. In another example, the implicit rule may identify the common beam based at least in part on a QCL assumption of an activated PDSCH TCI state (e.g., with the highest or lowest identifier) in the active DL BWP.

In some aspects, the UE 120 may determine (or identify) a common beam based at least in part on an explicit rule. The explicit rule may be based at least in part on one or more signals received by the UE 120 from the base station 110. For example, the explicit rule may specify that the common beam is identified based at least in part on a downlink signaling (e.g., a single DCI or MAC-CE) that jointly updates (1) the downlink TCI state of one or more target downlink signals and (2) an uplink spatial relation identifier or uplink TCI state of one or more target uplink signals. In another example, the explicit rule may specify that the common beam is identified based at least in part on a single DCI that updates the TCI state of a semi-persistent or aperiodic reference signal (e.g., CSI-RS or SRS) resource that serves as a QCL source reference signal for both (1) downlink TCIs of one or more target downlink signals and (2) an uplink spatial relation or uplink TCI of one or more target uplink signals. In still another example, the explicit rule may specify that the common beam is indicated for a group of uplink or downlink resources via downlink signaling (e.g., via RRC signaling, a MAC-CE, or a DCI). For example, RRC signaling may configure a resource group identifier for each uplink or downlink resource in a resource group or for a list of uplink and/or downlink resources in the group.

In some aspects, such as in a multi-TRP communication scenario, the UE 120 may identify a single common beam or multiple common beams. Whether the common beam is associated with a single common beam or multiple common beams may be determined, by the UE 120, based at least in part on a rule or dynamic signaling received from the base station 110 (e.g., in a DCI, a MAC-CE, or RRC signaling). In some aspects, where the common beam is associated with a single beam, the common beam may be selected as the common beam for a particular TRP in a multi-TRP scenario. The beam may be determined by a fixed rule. For example, a rule may specify that the common beam is the beam with the lowest TRP index or CORESET pool index. In some cases, the single common beam may be indicated via downlink signaling.

In some aspects, when the common beam is associated with multiple common beams, the multiple beams may be determined on a per-TRP basis. In a single-DCI-based multi-TRP scenario, the common beam for a first TRP may be determined based at least in part on a first TCI state in the TCI code point with the lowest identifier of the TCI code points mapped to two TCI states, and the common beam for a second TRP may be determined based at last in part on a second TCI state in the TCI code point. In a multi-DCI-based multi-TRP scenario, the common beam for a TRP may be determined based at least in part on a QCL assumption for receiving the CORESET with the lowest or highest identifier among CORESETS configured for an active downlink BWP and associated with the TRP (e.g., the CORESET having a corresponding CORESETPoolIndex).

As shown by reference number 615, the UE 120 may determine that a common beam is to be used as the default beam for aperiodic CSI-RSs, which is the default beam to be used by the UE if a scheduling offset between a scheduling DCI and a transmission time of an aperiodic CSI-RS scheduled by the scheduling DCI is less than a beam switch latency threshold of the UE 120, as described above. The UE 120 may determine that the common beam is to be used as the default beam for aperiodic CSI-RSs based at least in part on an implicit rule or an explicit indication.

For example, when the common beam is determined (or identified) using an implicit rule, as described above, the UE 120 may determine that the common beam is to be used as the default beam for aperiodic CSI-RSs based at least in part on an implicit rule that specifies that when a common beam is selected, the common beam may be used as the default CSI-RS beam. For example, the implicit rule may indicate that if a common beam is selected or identified using an implicit rule, then the common beam is always to be used by the UE 120 as the default beam for aperiodic CSI-RSs. In some aspects, when the common beam is determined (or identified) using an implicit rule, the UE 120 may determine that the common beam is to be used as the default beam for aperiodic CSI-RSs based at least in part on indication received from the base station 110. For example, the base station 110 may transmit an indication to the UE 120 that the common beam is to be used as the default beam via downlink signaling. The downlink signaling may include DCI, MAC-CE signaling, or RRC signaling. For example, the base station 110 may indicate that the common beam is to be used as the default beam for aperiodic CSI-RSs in a flag carried by an RRC signal.

In some aspects, when the common beam is determined (or identified) using an explicit rule, as described above, the UE 120 may determine that the common beam is to be used as the default beam for aperiodic CSI-RSs based at least in part on an implicit rule that specifies that when a common beam is determined using an explicit rule, the common beam may be used as the default CSI-RS beam. For example, the implicit rule may indicate that if a common beam is selected or identified using an explicit rule, then the common beam is always to be used by the UE 120 as the default beam for aperiodic CSI-RSs. In some aspects, when the common beam is determined (or identified) using an explicit rule, the UE 120 may determine that the common beam is to be used as the default beam for aperiodic CSI-RSs based at least in part on an indication received from the base station 110. For example, the base station 110 may transmit an indication to the UE 120 that the common beam is to be used as the default beam via downlink signaling. The downlink signaling may include DCI, MAC-CE signaling, or RRC signaling. For example, the base station 110 may indicate that the common beam is to be used as the default beam for aperiodic CSI-RSs in a flag carried by an RRC signal. As described above, the explicit rule may be associated with a signal transmitted by the base station 110 (e.g., a signal used to identify or update the common beam). In some aspects, the base station 110 may identify or update the common beam and indicate that the common beam is to be used as the default beam for aperiodic CSI-RSs in the same signal to conserve resources.

In a multi-TRP communication scenario, the indication that the common beam for one TRP is to be used as the default beam for an aperiodic CSI-RS for the same TRP may be determined by the UE 120 implicitly or explicitly, as described above.

As shown by reference number 620, the base station 110 may transmit, and the UE 120 may receive, DCI scheduling an aperiodic CSI-RS. The DCI may indicate a beam to be used by the UE 120 to receive the aperiodic CSI-RS and/or a transmission time of the aperiodic CSI-RS. As shown by reference number 625, the UE 120 may determine that the default beam is to be used to receive the aperiodic CSI-RS scheduled by the scheduling DCI. For example, the UE 120 may determine that a scheduling offset between the scheduling DCI and the transmission time of the aperiodic CSI-RS is less than a beam switch latency threshold of the UE 120. Therefore, the UE 120 may determine that the default beam (e.g., rather than the beam indicated by the scheduling DCI) is to be used to receive the aperiodic CSI-RS. In some aspects, if the scheduling DCI and the transmission time of the aperiodic CSI-RS is equal to or greater than the beam switch latency threshold of the UE 120, then the UE 120 may determine that the beam indicated by the scheduling DCI is to be used to receive the aperiodic CSI-RS.

As shown by reference number 630, the base station 110 may transmit the aperiodic CSI-RS as scheduled by the scheduling DCI. As shown by reference number 635, the UE 120 may receive the aperiodic CSI-RS using the common beam as the default beam, as described above.

In some aspects, the base station 110 may indicate that a selected or identified common beam is not to be used as the default beam for aperiodic CSI-RSs. For example, the base station 110 may indicate that a common beam, determined by the UE 120 based at least in part on an implicit rule, is not to be used as the default beam for aperiodic CSI-RSs. Similarly, the base station 110 may indicate that a common beam, determined by the UE 120 based at least in part on an explicit rule, is not to be used as the default beam for aperiodic CSI-RSs. In some aspects, the base station 110 may update a common beam or indicate a new common beam. The base station 110 may indicate that the updated common beam or the new common beam is not to be used as the default beam for aperiodic CSI-RSs.

When the base station 110 indicates that the common beam is not to be used as the default beam for aperiodic CSI-RSs, the UE 120 may determine the default beam for aperiodic CSI-RSs based at least in part on a QCL assumption of the CORESET with the lowest identifier in the latest monitored slot in an active downlink BWP. In some aspects, when the base station 110 indicates that a new or updated common beam is not to be used as the default beam for aperiodic CSI-RSs, the UE 120 may determine the default beam for aperiodic CSI-RSs based at least in part on last applicable common beam (e.g., a common beam that was determined or identified prior to the new or updated common beam). For example, the UE 120 may determine that the last applicable common beam (e.g., before the new or updated common beam) is to be used at the default beam for aperiodic CSI-RSs.

As a result, the UE 120 may be enabled to use an optimized common beam as the default beam for aperiodic CSI-RSs, thereby improving the efficiency of the communications. As the common beam may remain constant over time (and is optimized, as described above), the use of the common beam as the default beam for aperiodic CSI-RSs may result in improved communication performance and reliability when a default beam is used for an aperiodic CSI-RS. Moreover, the use of the common beam as the default beam for aperiodic CSI-RSs may reduce beam management latency and overhead. Additionally, the use of an optimized common beam as the default beam for aperiodic CSI-RSs may improve downlink channel estimation (e.g., downlink CSI acquisition) and/or CSI-RS beam management procedures by enabling the UE 120 to receive and/or measure an aperiodic CSI-RS using an optimized common beam, rather than a default beam that varies over time.

As indicated above, FIG. 6 is provided as an example. Other examples may differ from what is described with respect to FIG. 6.

Figure 7:
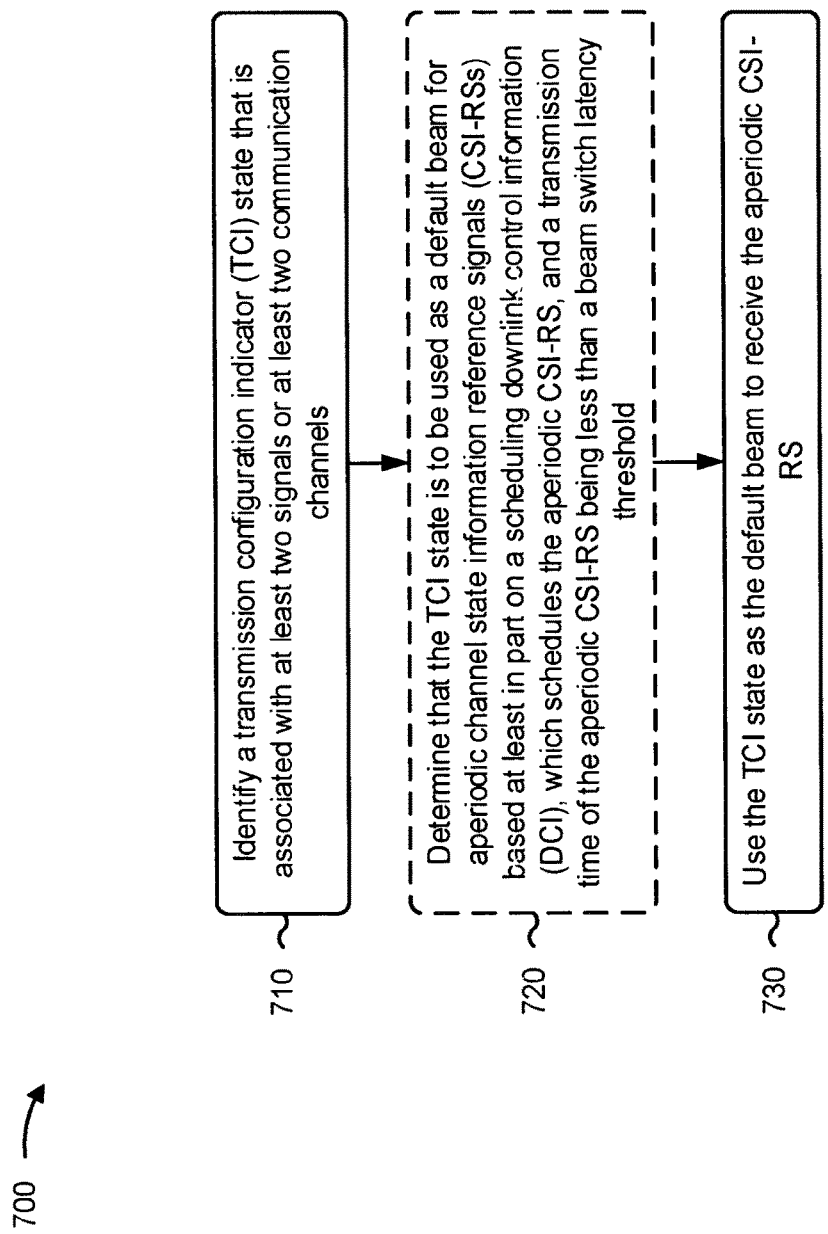
FIGS. 7 and 8 are diagrams illustrating example processes associated with using a common beam as a default beam for aperiodic CSI-RSs, in accordance with the present disclosure.

FIG. 7 is a diagram illustrating an example process 700 performed, for example, by a UE, in accordance with the present disclosure. Example process 700 is an example where the UE (e.g., UE 120) performs operations associated with using a common beam as a default beam for aperiodic CSI-RSs.

As shown in FIG. 7, in some aspects, process 700 may include identifying a TCI state that is associated with at least two signals or at least two communication channels (block 710). For example, the UE (e.g., using TCI state identification component 908, depicted in FIG. 9) may identify a TCI state that is associated with at least two signals or at least two communication channels, as described above.

As further shown in FIG. 7, in some aspects, process 700 may optionally include determining that the TCI state is to be used as a default beam for aperiodic CSI-RSs based at least in part on a scheduling offset between a scheduling DCI, which schedules the aperiodic CSI-RS, and a transmission time of the aperiodic CSI-RS being less than a beam switch latency threshold (block 720). For example, the UE (e.g., using default beam determination component 910, depicted in FIG. 9) may determine that the TCI state is to be used as a default beam for aperiodic CSI-RSs based at least in part on a scheduling offset between a scheduling DCI, which schedules the aperiodic CSI-RS, and a transmission time of the aperiodic CSI-RS being less than a beam switch latency threshold, as described above.

As further shown in FIG. 7, in some aspects, process 700 may include using the TCI state as the default beam for receiving the aperiodic CSI-RS based at least in part on a scheduling offset between a scheduling DCI, which schedules the aperiodic CSI-RS, and a transmission time of the aperiodic CSI-RS being less than a beam switch latency threshold (block 730). For example, the UE (e.g., using reception component 902, depicted in FIG. 9) may the TCI state as the default beam to receive an aperiodic CSI-RS based at least in part on a scheduling offset between a scheduling DCI, which schedules the aperiodic CSI-RS, and a transmission time of the aperiodic CSI-RS being less than a beam switch latency threshold, as described above.

Process 700 may include additional aspects, such as any single aspect or any combination of aspects described below and/or in connection with one or more other processes described elsewhere herein.

In a first aspect, identifying the TCI state that is associated with the at least two signals or at least two communication channels includes identifying the TCI state based at least in part on an implicit rule.

In a second aspect, alone or in combination with the first aspect, determining that the TCI state is to be used as the default beam for aperiodic CSI-RSs includes determining that the TCI state is always to be used by the UE as the default beam if a scheduling offset between scheduling DCI and a transmission time of an aperiodic CSI-RS scheduled by the scheduling DCI is less than the beam switch latency threshold.

In a third aspect, alone or in combination with the first aspect, determining that the TCI state is to be used as the default beam for aperiodic CSI-RSs includes receiving, from a base station, an indication that the TCI state is to be used as the default beam for aperiodic CSI-RSs.

In a fourth aspect, alone or in combination with the first or second aspects, receiving the indication that the TCI state is to be used as the default beam for aperiodic CSI-RSs includes receiving the indication via a DCI communication.

In a fifth aspect, alone or in combination with the first or second aspects, receiving the indication that the TCI state is to be used as the default beam for aperiodic CSI-RSs includes receiving the indication via a MAC-CE communication.

In a sixth aspect, alone or in combination with the first or second aspects, receiving the indication that the TCI state is to be used as the default beam for aperiodic CSI-RSs includes receiving the indication via an RRC communication.

In a seventh aspect, alone or in combination with one or more of the first through sixth aspects, determining the TCI state that is associated with the at least two signals or communication channels includes determining the TCI state based at least in part on an explicit rule.

In an eighth aspect, determining that the TCI state is to be used as the default beam for aperiodic CSI-RSs includes receiving, from a base station, an indication that the TCI state is to be used as the default beam for aperiodic CSI-RSs.

In a ninth aspect, alone or in combination with the eighth aspect, receiving the indication that the TCI state is to be used as the default beam for aperiodic CSI-RSs includes receiving the indication via a DCI communication.

In a tenth aspect, alone or in combination with the eighth aspect, receiving the indication that the TCI state is to be used as the default beam for aperiodic CSI-RSs includes receiving the indication via a MAC-CE communication.

In an eleventh aspect, alone or in combination with the eighth aspect, receiving the indication that the TCI state is to be used as the default beam for aperiodic CSI-RSs includes receiving the indication via an RRC communication.

In a twelfth aspect, alone or in combination with one or more of the eighth through eleventh aspects, receiving the indication that the TCI state is to be used as the default beam for aperiodic CSI-RSs includes receiving the indication of the TCI state and the indication that the TCI state is to be used as the default beam for aperiodic CSI-RSs in a same signal.

In a thirteenth aspect, alone or in combination with one or more of the first through twelfth aspects, determining the TCI state that is associated with at least two signals or communication channels includes determining a TCI state to be used for a multi-TRP configuration.

In a fourteenth aspect, alone or in combination with one or more of the first through thirteenth aspects, the TCI state to be used for the multi-TRP configuration is associated with a single beam or multiple beams.

In a fifteenth aspect, alone or in combination with one or more of the first through fourteenth aspects, determining that the TCI state is to be used as the default beam for aperiodic CSI-RSs includes determining that a TCI state, associated with a TRP of the multi-TRP configuration, is to be used as the default beam for aperiodic CSI-RSs associated with the TRP.

In a sixteenth aspect, alone or in combination with one or more of the first through fifteenth aspects, process 700 includes receiving, from a base station, an indication that the TCI state is not to be used as the default beam for aperiodic CSI-RSs.

In a seventeenth aspect, alone or in combination with one or more of the first through sixteenth aspects, process 700 includes determining another default beam for aperiodic CSI-RSs based at least in part on a quasi co-location assumption of a control resource set with a lowest identifier in a latest monitored slot of an active downlink bandwidth part.

In an eighteenth aspect, alone or in combination with one or more of the first through seventeenth aspects, process 700 includes determining that another TCI state, that was determined prior to determining the TCI state, is to be used as a new default beam for aperiodic CSI-RSs.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
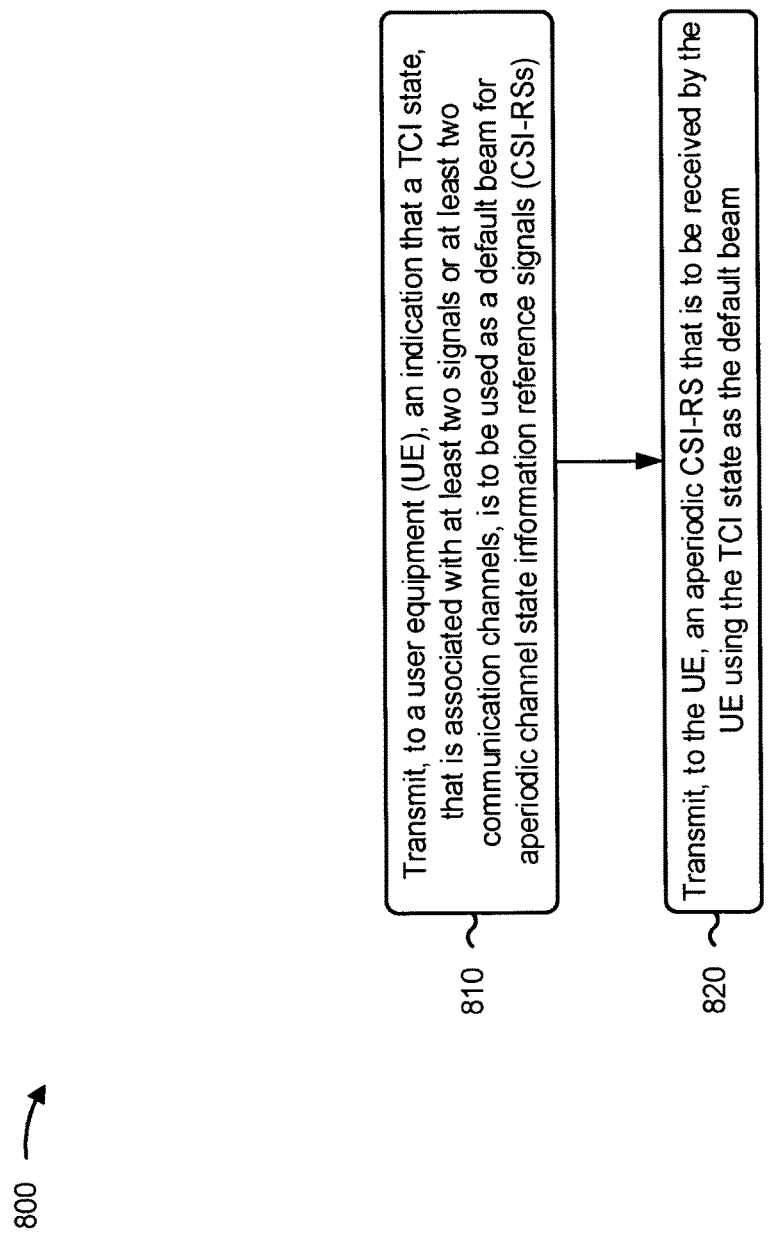

FIG. 8 is a diagram illustrating an example process 800 performed, for example, by a base station, in accordance with the present disclosure. Example process 800 is an example where the base station (e.g., base station 110) performs operations associated with using a common beam as a default beam for aperiodic CSI-RSs.

As shown in FIG. 8, in some aspects, process 800 may include transmitting, to a UE, an indication that a TCI state, that is associated with at least two signals or at least two communication channels, is to be used as a default beam for aperiodic CSI-RSs (block 810). For example, the base station (e.g., using transmission component 1004, depicted in FIG. 10) may transmit, to a UE, an indication that a TCI state, that is associated with at least two signals or at least two communication channels, is to be used as a default beam for aperiodic CSI-RSs, as described above.

As further shown in FIG. 8, in some aspects, process 800 may include transmitting, to the UE, an aperiodic CSI-RS that is to be received by the UE using the TCI state as the default beam (block 820). For example, the base station (e.g., using transmission component 1004, depicted in FIG. 10) may transmit, to the UE, an aperiodic CSI-RS that is to be received by the UE using the TCI state as the default beam, as described above.

Process 800 may include additional aspects, such as any single aspect or any combination of aspects described below and/or in connection with one or more other processes described elsewhere herein.

In a first aspect, process 800 includes transmitting, to the UE, a configuration indicating that the UE is to use the default beam for aperiodic CSI-RSs if a scheduling offset between a scheduling DCI and a transmission time of an aperiodic CSI-RS that is scheduled by the scheduling DCI is less than the beam switch latency threshold.

In a second aspect, alone or in combination with the first aspect, the TCI state is determined by the UE based at least in part on an implicit indication.

In a third aspect, alone or in combination with one or more of the first and second aspects, transmitting the indication that the TCI state is to be used as the default beam for aperiodic CSI-RSs includes transmitting the indication via a DCI communication.

In a fourth aspect, alone or in combination with one or more of the first and second aspects, transmitting the indication that the TCI state is to be used as the default beam for aperiodic CSI-RSs includes transmitting the indication via a MAC-CE communication.

In a fifth aspect, alone or in combination with one or more of the first and second aspects, transmitting the indication that the TCI state is to be used as the default beam for aperiodic CSI-RSs includes transmitting the indication via an RRC communication.

In a sixth aspect, alone or in combination with the first aspect, process 800 includes transmitting, to the UE, an indication of the TCI state.

In a seventh aspect, alone or in combination with one or more of the first or sixth aspects, transmitting the indication that the TCI state is to be used as the default beam for aperiodic CSI-RSs includes transmitting the indication via a DCI communication.

In an eighth aspect, alone or in combination with one or more of the first or sixth aspects, transmitting the indication that the TCI state is to be used as the default beam for aperiodic CSI-RSs includes transmitting the indication via a MAC-CE communication.

In a ninth aspect, alone or in combination with one or more of the first or sixth aspects, transmitting the indication that the TCI state is to be used as the default beam for aperiodic CSI-RSs includes transmitting the indication via an RRC communication.

In a tenth aspect, alone or in combination with one or more of the first or sixth through ninth aspects, transmitting the indication that the TCI state is to be used as the default beam for aperiodic CSI-RSs includes transmitting the indication of the TCI state and the indication that the TCI state is to be used as the default beam for aperiodic CSI-RSs in a same signal.

In an eleventh aspect, alone or in combination with one or more of the first through tenth aspects, process 800 includes determining a TCI state to be used for a multi-TRP configuration.

In a twelfth aspect, alone or in combination with one or more of the first through eleventh aspects, the TCI state to be used for the multi-TRP configuration is associated with a single beam or multiple beams.

In a thirteenth aspect, alone or in combination with one or more of the first through twelfth aspects, transmitting the indication that the TCI state is to be used as the default beam for aperiodic CSI-RSs includes transmitting, to the UE, an indication that a TCI state, associated with a TRP of the multi-TRP configuration, is to be used as the default beam for aperiodic CSI-RSs associated with the TRP.

In a fourteenth aspect, alone or in combination with one or more of the first through thirteenth aspects, process 800 includes transmitting, to the UE, an indication that the TCI state is no longer to be used as the default beam.

In a fifteenth aspect, alone or in combination with one or more of the first through fourteenth aspects, process 800 includes determining the TCI state that is associated with at least two signals or communication channels.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
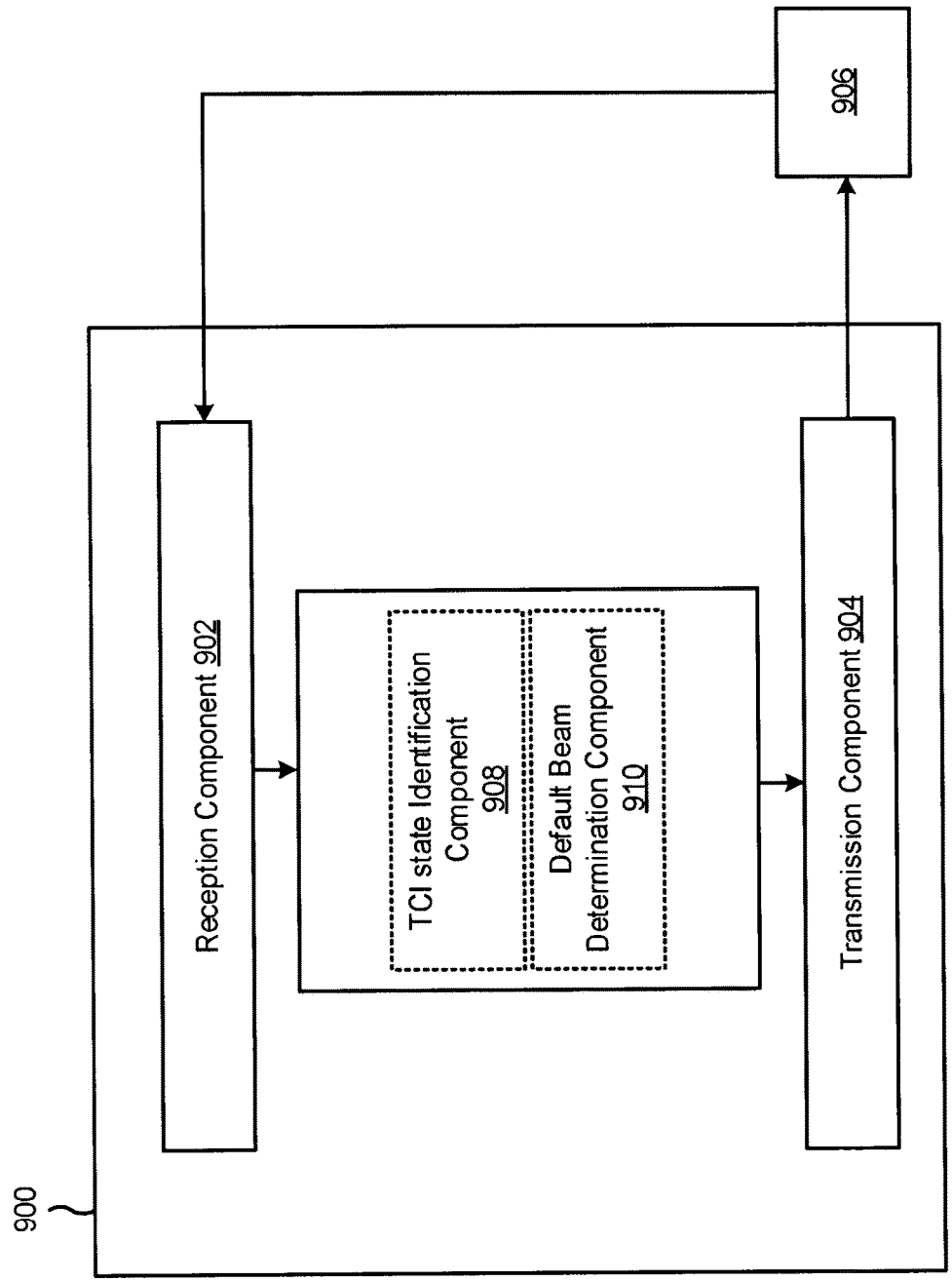
FIGS. 9 and 10 are block diagrams of example apparatuses for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of a TCI state identification component 908 or a default beam determination component 910, among other examples.

In some aspects, the apparatus 900 may be configured to perform one or more operations described herein in connection with FIG. 6. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The TCI state identification component 908 may identify a TCI state that is associated with at least two signals or at least two communication channels. The TCI state identification component 908 may include a controller/processor and/or a memory 282, of the UE described above in connection with FIG. 2. The default beam determination component 910 may determine that the TCI state is to be used as a default beam for aperiodic CSI-RSs, where the default beam is to be used by the UE if a scheduling offset between a scheduling DCI and a transmission time of an aperiodic CSI-RS scheduled by the scheduling DCI is less than a beam switch latency threshold. The default beam determination component 910 may include a controller/processor and/or a memory 282, of the UE described above in connection with FIG. 2. The reception component 902 may use the TCI state as the default beam to receive an aperiodic CSI-RS based at least in part on a scheduling offset between a scheduling DCI, which schedules the aperiodic CSI-RS, and a transmission time of the aperiodic CSI-RS being less than the beam switch latency threshold.

The reception component 902 may receive, from a base station, an indication that the TCI state is not to be used as the default beam for aperiodic CSI-RSs.

The default beam determination component 910 may determine another default beam for aperiodic CSI-RSs based at least in part on a quasi co-location assumption of a control resource set with a lowest identifier in a latest monitored slot of an active downlink bandwidth part.

The default beam determination component 910 may determine that another TCI state, that was determined prior to determining the TCI state, is to be used as a new default beam for aperiodic CSI-RSs.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
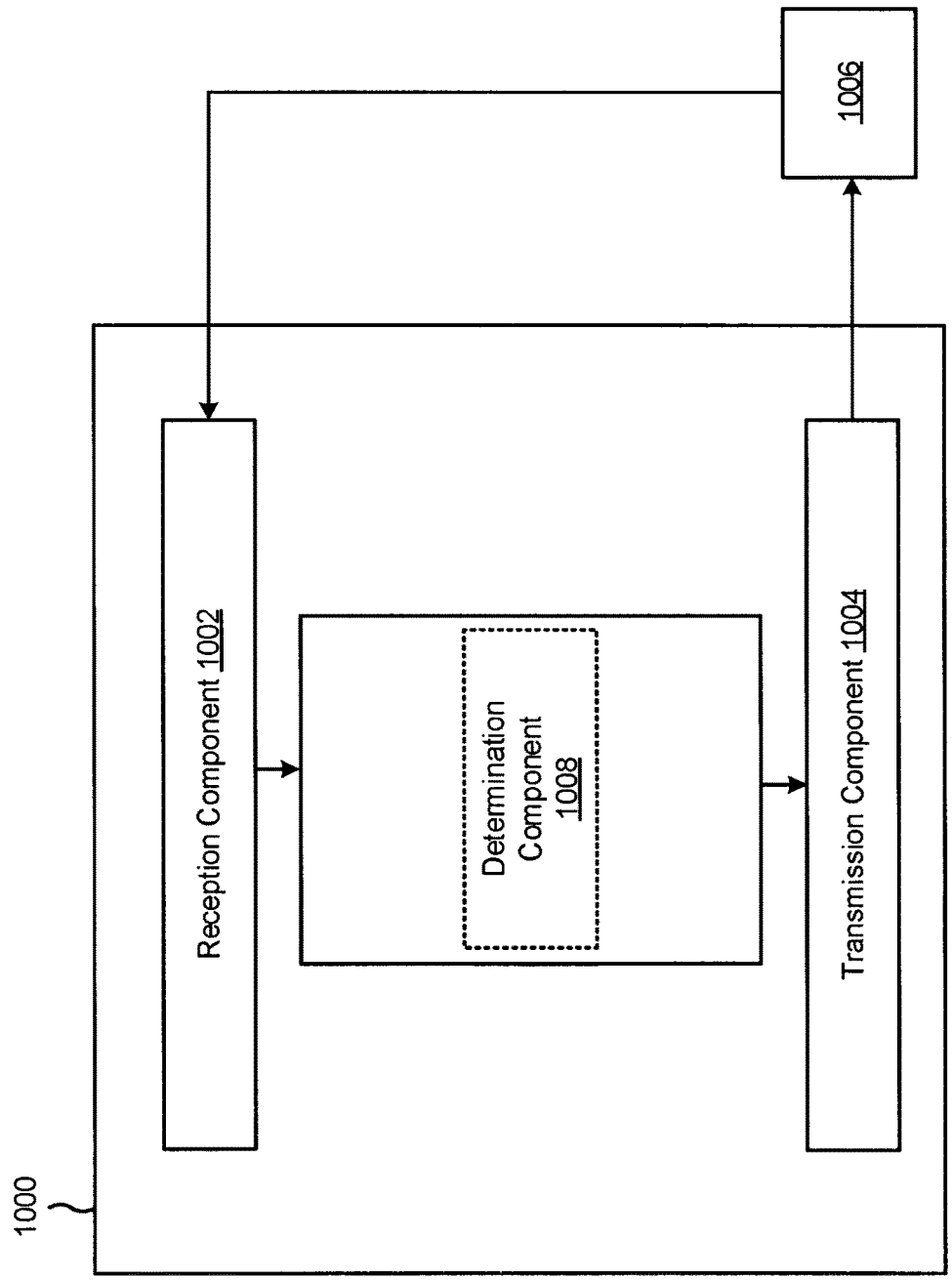

FIG. 10 is a block diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a determination component 1008, among other examples.

In some aspects, the apparatus 1000 may be configured to perform one or more operations described herein in connection with FIG. 6. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the base station described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the base station described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station described above in connection with FIG. 2. In some aspects, the transmission component 1004 may be co-located with the reception component 1002 in a transceiver.

The transmission component 1004 may transmit, to a UE, an indication that a TCI state, that is associated with at least two signals or communication channels, is to be used as a default beam for aperiodic CSI-RSs, where the default beam is to be used by the UE if a scheduling offset between a scheduling DCI and a transmission time of an aperiodic CSI-RS scheduled by the scheduling DCI is less than a beam switch latency threshold associated with the UE. The transmission component 1004 may transmit, to the UE, an aperiodic CSI-RS that is to be received by the UE using the TCI state as the default beam.

The transmission component 1004 may transmit, to the UE, a configuration indicating that the UE is to use the default beam for aperiodic CSI-RSs if a scheduling offset between a scheduling DCI and a transmission time of an aperiodic CSI-RS that is scheduled by the scheduling DCI is less than the beam switch latency threshold.

The transmission component 1004 may transmit, to the UE, an indication of the TCI state.

The determination component 1008 may determine a TCI state to be used for a multi-TRP configuration. The determination component 1008 may include a controller/processor and/or a memory 242 of the base station described above in connection with FIG. 2.

The transmission component 1004 may transmit, to the UE, an indication that the TCI state is no longer to be used as the default beam.

The determination component 1008 may determine the TCI state that is associated with at least two signals or communication channels.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: identifying a transmission configuration indicator (TCI) state that is associated with at least two signals or at least two communication channels; and using the TCI state as a default beam for receiving an aperiodic channel state information reference signal (CSI-RS) based at least in part on a scheduling offset between a scheduling downlink control information (DCI), which schedules the aperiodic CSI-RS, and a transmission time of the aperiodic CSI-RS being less than a beam switch latency threshold.

Aspect 2: The method of Aspect 1, wherein using the TCI state as the default beam is based at least in part on always using the TCI state as the default beam.

Aspect 3: The method of any of Aspects 1-2, wherein identifying the TCI state that is associated with the at least two signals or at least two communication channels comprises: identifying the TCI state based at least in part on an implicit rule.

Aspect 4: The method of Aspect 3, further comprising: receiving, from a base station, an indication that the TCI state is to be used as the default beam for aperiodic CSI-RSs.

Aspect 5: The method of Aspect 4, wherein receiving the indication that the TCI state is to be used as the default beam for aperiodic CSI-RSs comprises: receiving the indication via a DCI communication.

Aspect 6: The method of Aspect 4, wherein receiving the indication that the TCI state is to be used as the default beam for aperiodic CSI-RSs comprises: receiving the indication via a medium access control (MAC) control element (MAC-CE) communication.

Aspect 7: The method of Aspect 4, wherein receiving the indication that the TCI state is to be used as the default beam for aperiodic CSI-RSs comprises: receiving the indication via a radio resource control (RRC) communication.

Aspect 8: The method of any of Aspects 1-7, wherein identifying the TCI state that is associated with the at least two signals or at least two communication channels comprises: identifying the TCI state based at least in part on an explicit rule.

Aspect 9: The method of Aspect 8, further comprising: receiving, from a base station, an indication that the TCI state is to be used as the default beam for aperiodic CSI-RSs.

Aspect 10: The method of Aspect 9, wherein receiving the indication that the TCI state is to be used as the default beam for aperiodic CSI-RSs comprises: receiving the indication via a DCI communication.

Aspect 11: The method of Aspect 9, wherein receiving the indication that the TCI state is to be used as the default beam for aperiodic CSI-RSs comprises: receiving the indication via a medium access control (MAC) control element (MAC-CE) communication.

Aspect 12: The method of Aspect 9, wherein receiving the indication that the TCI state is to be used as the default beam for aperiodic CSI-RSs comprises: receiving the indication via a radio resource control (RRC) communication.

Aspect 13: The method of any of Aspects 9-12, wherein receiving the indication that the TCI state is to be used as the default beam for aperiodic CSI-RSs comprises: receiving an indication of the TCI state and the indication that the TCI state is to be used as the default beam for aperiodic CSI-RSs in a same signal.

Aspect 14: The method of any of Aspects 1-13, wherein identifying the TCI state that is associated with at least two signals or at least two communication channels comprises: identifying that the TCI state is to be used for a multiple transmit receive point (multi-TRP) configuration.

Aspect 15: The method of Aspect 14, wherein the TCI state to be used for the multi-TRP configuration is associated with a single beam or multiple beams.

Aspect 16: The method of any of Aspects 14-15, wherein the TCI state, associated with a TRP of the multi-TRP configuration, is to be used as the default beam for aperiodic CSI-RSs associated with the TRP.

Aspect 17: The method of any of Aspects 1-16, further comprising: receiving, from a base station, an indication that the TCI state is not to be used as the default beam for aperiodic CSI-RSs.

Aspect 18: The method of Aspect 17, further comprising: determining another default beam for aperiodic CSI-RSs based at least in part on a quasi co-location assumption of a control resource set with a lowest identifier in a latest monitored slot of an active downlink bandwidth part.

Aspect 19: The method of any of Aspects 17-18, further comprising: determining that another TCI state, that was determined prior to identifying the TCI state, is to be used as a new default beam for aperiodic CSI-RSs.

Aspect 20: The method of any of Aspects 1-19, further comprising: receiving the scheduling DCI which schedules the aperiodic CSI-RS, wherein the DCI indicates the transmission time of the aperiodic CSI-RS; and determining that the scheduling offset between the scheduling DCI and the transmission time of the aperiodic CSI-RS is less than the beam switch latency threshold.

Aspect 21: A method of wireless communication performed by a base station, comprising: transmitting, to a user equipment (UE), an indication that a transmission configuration indicator (TCI) state, that is associated with at least two signals or at least two communication channels, is to be used as a default beam for aperiodic channel state information reference signals (CSI-RSs); and transmitting, to the UE, an aperiodic CSI-RS that is to be received by the UE using the TCI state as the default beam.

Aspect 22: The method of Aspect 20, further comprising: transmitting, to the UE, a configuration indicating that the UE is to use the default beam for aperiodic CSI-RSs if a scheduling offset between a scheduling DCI and a transmission time of an aperiodic CSI-RS that is scheduled by the scheduling DCI is less than the beam switch latency threshold.

Aspect 23: The method of any of Aspects 20-21, wherein the TCI state is identified by the UE based at least in part on an implicit indication.

Aspect 24: The method of Aspect 22, wherein transmitting the indication that the TCI state is to be used as the default beam for aperiodic CSI-RSs comprises: transmitting the indication via a DCI communication.

Aspect 25: The method of Aspect 22, wherein transmitting the indication that the TCI state is to be used as the default beam for aperiodic CSI-RSs comprises: transmitting the indication via a medium access control (MAC) control element (MAC-CE) communication.

Aspect 26: The method of Aspect 22, wherein transmitting the indication that the TCI state is to be used as the default beam for aperiodic CSI-RSs comprises: transmitting the indication via a radio resource control (RRC) communication.

Aspect 27: The method of any of Aspects 20-25, further comprising: transmitting, to the UE, an indication of the TCI state.

Aspect 28: The method of Aspect 26, wherein transmitting the indication that the TCI state is to be used as the default beam for aperiodic CSI-RSs comprises: transmitting the indication via a DCI communication.

Aspect 29: The method of Aspect 26, wherein transmitting the indication that the TCI state is to be used as the default beam for aperiodic CSI-RSs comprises: transmitting the indication via a medium access control (MAC) control element (MAC-CE) communication.

Aspect 30: The method of Aspect 26, wherein transmitting the indication that the TCI state is to be used as the default beam for aperiodic CSI-RSs comprises: transmitting the indication via a radio resource control (RRC) communication.

Aspect 31: The method of any of Aspects 26-29, wherein transmitting the indication that the TCI state is to be used as the default beam for aperiodic CSI-RSs comprises: transmitting the indication of the TCI state and the indication that the TCI state is to be used as the default beam for aperiodic CSI-RSs in a same signal.

Aspect 32: The method of any of Aspects 20-30, further comprising: determining that the TCI state is to be used for a multiple transmit receive point (multi-TRP) configuration.

Aspect 33: The method of Aspect 31, wherein the TCI state to be used for the multi-TRP configuration is associated with a single beam or multiple beams.

Aspect 34: The method of any of Aspects 31-32, wherein transmitting the indication that the TCI state is to be used as the default beam for aperiodic CSI-RSs comprises: transmitting, to the UE, an indication that the TCI state, associated with a TRP of the multi-TRP configuration, is to be used as the default beam for aperiodic CSI-RSs associated with the TRP.

Aspect 35: The method of any of Aspects 20-33, further comprising: transmitting, to the UE, an indication that the TCI state is no longer to be used as the default beam.

Aspect 36: The method of any of Aspects 20-34, further comprising: determining the TCI state that is associated with at least two signals or communication channels.

Aspect 37: An apparatus for wireless communication at a device, comprising a processor; memory coupled with the processor; and instructions stored in the memory and executable by the processor to cause the apparatus to perform the method of one or more of Aspects 1-20.

Aspect 38: A device for wireless communication, comprising a memory and one or more processors coupled to the memory, the one or more processors configured to perform the method of one or more of Aspects 1-20.

Aspect 39: An apparatus for wireless communication, comprising at least one means for performing the method of one or more of Aspects 1-20.

Aspect 40: A non-transitory computer-readable medium storing code for wireless communication, the code comprising instructions executable by a processor to perform the method of one or more of Aspects 1-20.

Aspect 41: A non-transitory computer-readable medium storing a set of instructions for wireless communication, the set of instructions comprising one or more instructions that, when executed by one or more processors of a device, cause the device to perform the method of one or more of Aspects 1-20.

Aspect 42: An apparatus for wireless communication at a device, comprising a processor; memory coupled with the processor; and instructions stored in the memory and executable by the processor to cause the apparatus to perform the method of one or more of Aspects 21-36.

Aspect 43: A device for wireless communication, comprising a memory and one or more processors coupled to the memory, the one or more processors configured to perform the method of one or more of Aspects 21-36.

Aspect 44: An apparatus for wireless communication, comprising at least one means for performing the method of one or more of Aspects 21-36.

Aspect 45: A non-transitory computer-readable medium storing code for wireless communication, the code comprising instructions executable by a processor to perform the method of one or more of Aspects 21-36.

Aspect 46: A non-transitory computer-readable medium storing a set of instructions for wireless communication, the set of instructions comprising one or more instructions that, when executed by one or more processors of a device, cause the device to perform the method of one or more of Aspects 21-36.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    identifying a transmission configuration indicator (TCI) state that is associated with at least two signals or at least two communication channels, wherein the TCI state is based at least in part on a control resource set associated with a bandwidth part for receiving an aperiodic channel state information reference signal (CSI-RS); and using the TCI state as a default beam for receiving the aperiodic CSI-RS based at least in part on a scheduling offset between a scheduling downlink control information (DCI), which schedules the aperiodic CSI-RS, and a transmission time of the aperiodic CSI-RS being less than a beam switch latency threshold.

2. The method of claim 1, wherein using the TCI state as the default beam is based at least in part on always using the TCI state as the default beam.

3. The method of claim 1, wherein identifying the TCI state that is associated with the at least two signals or at least two communication channels comprises:

identifying the TCI state based at least in part on an implicit rule.

4. The method of claim 3, further comprising:

receiving, from a base station, an indication that the TCI state is to be used as the default beam for aperiodic CSI-RSs.

5. The method of claim 4, wherein receiving the indication that the TCI state is to be used as the default beam for aperiodic CSI-RSs comprises:

receiving the indication via at least one of a DCI communication, a medium access control (MAC) control element (MAC-CE) communication, or a radio resource control (RRC) communication.

6. The method of claim 1, wherein identifying the TCI state that is associated with the at least two signals or at least two communication channels comprises:

identifying the TCI state based at least in part on an explicit rule.

7. The method of claim 6, further comprising:

receiving, from a base station, an indication that the TCI state is to be used as the default beam for aperiodic CSI-RSs.

8. The method of claim 7, wherein receiving the indication that the TCI state is to be used as the default beam for aperiodic CSI-RSs comprises:

receiving the indication via at least one of a DCI communication, a medium access control (MAC) control element (MAC-CE) communication, or a radio resource control (RRC) communication.

9. The method of claim 7, wherein receiving the indication that the TCI state is to be used as the default beam for aperiodic CSI-RSs comprises:

receiving an indication of the TCI state and the indication that the TCI state is to be used as the default beam for aperiodic CSI-RSs in a same signal.

10. The method of claim 1, wherein identifying the TCI state that is associated with at least two signals or at least two communication channels comprises:

identifying that the TCI state is to be used for a multiple transmit receive point (multi-TRP) configuration.

11. The method of claim 10, wherein the TCI state to be used for the multi-TRP configuration is associated with a single beam or multiple beams.

12. The method of claim 10, the TCI state, associated with a TRP of the multi-TRP configuration, is to be used as the default beam for aperiodic CSI-RSs associated with the TRP.

13. The method of claim 1, further comprising:

receiving, from a base station, an indication that the TCI state is not to be used as the default beam for aperiodic CSI-RSs.

14. The method of claim 13, further comprising:

determining another default beam for aperiodic CSI-RSs based at least in part on a quasi co-location assumption of flail the control resource set with a lowest identifier in a latest monitored slot of the bandwidth part, wherein the bandwidth part comprises an active downlink bandwidth part.

15. The method of claim 13, further comprising:

determining that another TCI state, that was determined prior to identifying the TCI state, is to be used as a new default beam for aperiodic CSI-RSs.

16. The method of claim 1, further comprising:

receiving the scheduling DCI which schedules the aperiodic CSI-RS, wherein the DCI indicates the transmission time of the aperiodic CSI-RS; and determining that the scheduling offset between the scheduling DCI and the transmission time of the aperiodic CSI-RS is less than the beam switch latency threshold.

17. A method of wireless communication performed by a base station, comprising:

transmitting, to a user equipment (UE), an indication that a transmission configuration indicator (TCI) state, that is associated with at least two signals or at least two communication channels, is to be used as a default beam for aperiodic channel state information reference signals (CSI-RSs), wherein the TCI state is based at least in part on a control resource set associated with a bandwidth part for transmitting an aperiodic channel state information reference signal (CSI-RS); and transmitting, to the UE, the aperiodic CSI-RS that is to be received by the UE using the TCI state as the default beam.

18. The method of claim 17, further comprising:

transmitting, to the UE, a configuration indicating that the UE is to use the default beam for aperiodic CSI-RSs if a scheduling offset between a scheduling DCI and a transmission time of an aperiodic CSI-RS that is scheduled by the scheduling DCI is less than a beam switch latency threshold.

19. The method of claim 17, wherein the TCI state is identified by the UE based at least in part on an implicit indication.

20. The method of claim 19, wherein transmitting the indication that the TCI state is to be used as the default beam for aperiodic CSI-RSs comprises:

transmitting the indication via at least one of a DCI communication, a medium access control (MAC) control element (MAC-CE) communication, or a radio resource control (RRC) communication.

21. The method of claim 17, further comprising:

transmitting, to the UE, an indication of the TCI state.

22. The method of claim 21, wherein transmitting the indication that the TCI state is to be used as the default beam for aperiodic CSI-RSs comprises:

transmitting the indication via at least one of a DCI communication, a medium access control (MAC) control element (MAC-CE) communication, or a radio resource control (RRC) communication.

23. The method of claim 21, wherein transmitting the indication that the TCI state is to be used as the default beam for aperiodic CSI-RSs comprises:

transmitting the indication of the TCI state and the indication that the TCI state is to be used as the default beam for aperiodic CSI-RSs in a same signal.

24. The method of claim 17, further comprising:
determining that the TCI state is to be used for a multiple transmit receive point (multi-TRP) configuration.

25. The method of claim 24, wherein transmitting the indication that the TCI state is to be used as the default beam for aperiodic CSI-RSs comprises:
transmitting, to the UE, an indication that the TCI state, associated with a TRP of the multi-TRP configuration, is to be used as the default beam for aperiodic CSI-RSs associated with the TRP.

26. The method of claim 17, further comprising:
transmitting, to the UE, an indication that the TCI state is no longer to be used as the default beam.

27. A user equipment (UE) for wireless communication, comprising:
one or more memories; and
one or more processors, coupled to the one or more memories, configured to:
identify a transmission configuration indicator (TCI) state that is associated with at least two signals or at least two communication channels, wherein the TCI state is based at least in part on a control resource set associated with a bandwidth part for receiving an aperiodic channel state information reference signal (CSI-RS); and
use the TCI state as a default beam for receiving the aperiodic CSI-RS based at least in part on a scheduling offset between a scheduling downlink control information (DCI), which schedules the aperiodic CSI-RS, and a transmission time of the aperiodic CSI-RS being less than a beam switch latency threshold.

28. A base station for wireless communication, comprising: one or more memories; and
one or more processors, coupled to the one or more memories, configured to:
transmit, to a user equipment (UE), an indication that a transmission configuration indicator (TCI) state, that is associated with at least two signals or at least two communication channels, is to be used as a default beam for aperiodic channel state information reference signals (CSI-RSs), wherein the TCI state is based at least in part on a control resource set associated with a bandwidth part for transmitting an aperiodic channel state information reference signal (CSI-RS); and
transmit, to the UE, the aperiodic CSI-RS that is to be received by the UE using the TCI state as the default beam.

* * * * *